(12) United States Patent
Furukawa et al.

(10) Patent No.: US 6,584,054 B2
(45) Date of Patent: Jun. 24, 2003

(54) OPTICAL RECORDING METHOD AND OPTICAL RECORDING DEVICE

(75) Inventors: Shigeaki Furukawa, Kadoma (JP); Kenichi Nishiuchi, Hirakata (JP); Yuuichi Kamioka, Katano (JP); Norifumi Oda, Takatsuki (JP)

(73) Assignee: Matsushita Electric Industrial Co., Ltd., Osaka (JP)

(*) Notice: Subject to any disclaimer, the term of this patent is extended or adjusted under 35 U.S.C. 154(b) by 0 days.

(21) Appl. No.: 10/025,664

(22) Filed: Dec. 17, 2001

(65) Prior Publication Data
US 2002/0080703 A1 Jun. 27, 2002

Related U.S. Application Data

(62) Division of application No. 09/155,661, filed as application No. PCT/JP97/04663 on Dec. 17, 1997, now Pat. No. 6,345,026.

(30) Foreign Application Priority Data
Dec. 20, 1996 (JP) .............................................. 8-341014

(51) Int. Cl.⁷ ................................................ G11B 7/00
(52) U.S. Cl. .................... 369/59.11; 369/116; 369/59.1

(58) Field of Search .............................. 369/47.1, 53.1, 369/47.55, 53.11, 53.22, 53.41, 59.1, 59.11, 59.12, 116

(56) References Cited

U.S. PATENT DOCUMENTS 5,513,165 A * 4/1996 Ide et al. ..................... 369/116
6,101,159 A * 8/2000 Shoji et al. .............. 369/47.19

* cited by examiner

Primary Examiner—Muhammad Edun
(74) Attorney, Agent, or Firm—Merchant & Gould P.C.

(57) ABSTRACT

An optical recording device comprises: a basic pulse generator 60 including a starting-end pulse generation circuit 2, a burst gate generation circuit 4, and an end pulse generation circuit 6; a data-length detector 61 including a front mark detector 40, a front space detector 41, a recording mark detector 42, a back space detector 43 and a back mark detector 44; a timing controller 62 including a starting-end pulse selecting circuit 14, a starting-end starting position setting circuit 15, a starting-end pulse delaying circuit 19, an end pulse selecting circuit 21, an end starting position setting circuit 35 and an end pulse delaying circuit 25; a pulse synthesizer 63 including an AND gate 27 and an OR gate 36; and a laser driver 64 including an erasing current source 32, a recording current source 33, and a switch 34.

7 Claims, 9 Drawing Sheets

OPTICAL RECORDING METHOD AND OPTICAL RECORDING DEVICE

This application is a divisional of application Ser. No. 09/155,661, filed Oct. 1, 1998, now U.S. Pat. No. 6,345,026, which application(s) are incorporated herein by reference.

FIELD OF THE INVENTION

This invention relates to an optical recording method and an optical recording device in which information is recorded as lengths of marks and spaces at high density by irradiating optical beams onto a recording thin film formed on a substrate.

BACKGROUND OF THE INVENTION

Recently, optical recording media capable of recording, reading and erasing information have been commercialized. Furthermore, high-density rewritable optical recording media capable of recording qualified animation have been actively researched and developed.

Well-known rewritable optical recording media include phase-change optical recording media with recording layers either of chalcogenide thin films or semimetal thin films on a disc-shape substrate. The chalcogenide thin films comprise Te or Se, for example, Ge—Sb—Te, In—Se, or the like, as a base. The semimetal thin films comprise In—Sb or the like. Magneto-optical recording media having metal thin films such as Fe—Tb—Co as their recording layers also are well known. Further, there are also write-once-type optical recording media using pigment materials.

In phase-change optical recording media, recording thin films comprising the above-mentioned phase-change materials are instantly irradiated with laser beams focused on submicron-order size optical spots to heat the irradiated parts partially. When the temperature of the irradiated portion becomes equal to or higher than the crystalline temperature, the irradiated portion is changed to the crystalline state. When the irradiated portion is melted at a temperature higher than its melting point and is quenched, its state is changed to the amorphous state. Once either the crystalline state or the amorphous state is determined so as to correspond to the recording state, and the other to the erasing state (unrecorded state), information can be recorded reversibly by forming a pattern changing between the amorphous state and the crystalline state corresponding to information signals. Since the crystalline state and the amorphous state are different from each other in their optical characteristics, recorded signals can be read by optically detecting such different characteristics as a reflectivity change or a transmittance change.

In a magneto-optical recording medium, focused laser beams are irradiated on a magneto-optical recording thin film, so that the irradiated portions are partially heated. A magnetic field is applied to the heated portion in order to reverse the magnetizing direction of the magneto-optical recording thin film at the irradiated portions corresponding to the information to be recorded, thus recording information.

Methods of recording data on optical recording media at a high density include a mark-length recording. In the mark-length recording, marks with various lengths are recorded at various intervals (spaces), and the recording information is allocated to both the mark lengths and the space lengths. For example, in a phase-change recording medium, information can be recorded by setting amorphous regions as marks and crystalline regions as spaces.

In order to record information at higher density, it is necessary to shorten the mark lengths and the space lengths to be recorded. However, when the space lengths become shorter, the heat of a recorded mark-end affects the temperature increase at the starting-end of a mark to be recorded next. The position shift of a recorded-mark front-edge from the proper position caused by such thermal interference contributes to the aggravation of BER (bit error rate) when reading the information.

Examples of the method for improving the problem mentioned above are described, for example, in Unexamined Japanese Patent Application Tokkai Hei 5-234079 and Tokkai Hei 7-129959. In the applications mentioned above, a method of recording information by delaying the starting-end position of a recording pulse beforehand so as to compensate for the shift quantity of a mark-front-end position due to thermal interference is proposed. This recording method will be explained with reference to FIGS. 9(a)–(e).

FIG. 9(a) shows a pulse shape of data to be recorded. Levels of logic 1 and logic 0 correspond to marks and spaces, respectively. In accordance with the data shown in FIG. 9(a), the recording pulse shown in FIG. 9(b) is generated, thus forming the recording marks shown in FIG. 9(c) on an optical recording medium.

As shown in FIG. 9(c), when the recording density increases and therefore a space length between marks becomes shorter, the heat of a recorded mark 90 affects the front-edge of a mark 91 to be recorded. Consequently, the front-edge temperature becomes higher than that when the space length is sufficiently long. As a result, the front-edge of the mark 91 expands greatly as shown with a reference number 92, and therefore the front-edge is formed ahead of the proper position.

When a space (a period at level 0) in the data to be recorded is short, the correction for delaying the front-edge of the recording pulse so as to compensate for the delay quantity 93 is made as shown in FIG. 9(d). By this correction, the front-edge of the mark 91 is formed at the proper position corresponding to the front-edge of the recording data.

At a further higher density, not only a space length directly in front of a mark to be recorded but also a mark length in front of the space and a space length and a mark length further ahead, cause the temperature increase at the front-edge of the mark to be recorded, thus further affecting the front-edge shift quantity. Especially, the mark length in front of the space directly in front of the mark to be recorded affects greatly. This is because a long mark length requires a correspondingly long heating time by laser beams, and therefore the larger amount of heat is conducted to the front-edge of a mark to be recorded next. Thus, it is preferable that the delay quantity of the front-edge of a recording pulse is determined based on the lengths of a space directly in front of the mark to be recorded and of a mark in front of the space. When determining the delay quantity considering the lengths of a mark and a space further ahead, the front-edge shift can be corrected more precisely. Considering recording density, allowable error rate, processor capacity used in a device, cost, and the like, it will be decided how many spaces and marks before the mark to be recorded should be taken into account.

As described above, conventionally, a recording method in which front-edge shift is corrected considering the relation between a space length and a mark length directly in front of a recording mark and the front-edge shift of the recording mark is suggested. However, the position-shifts of not only the front-edge but also the end-edge of the mark cause the deterioration in the error rate when reading signals. It was found that the end-edge position of the recording mark was affected not only by space and mark lengths in front of the recording mark but also by space and mark lengths behind the recording mark. It can be conceived that this is because a cooling process of the recording mark is affected by the heat of the mark to be recorded next.

SUMMARY OF THE INVENTION

An object of the present invention is to provide an optical recording-reading method and an optical recording-reading device in which the deterioration in the error rate when reading signals is restrained by correcting the front- and end-edge shifts of recording marks caused by heat interference, thus obtaining high-quality reading signals.

In an optical recording-reading method of the present invention, when recording information on a recording thin film as lengths of marks and spaces, the position of a mark-end at the end of recording is changed according to the lengths of a mark to be recorded, of a space directly behind the recording mark and of a mark behind the space. According to this recording method, the edge shift of the mark-end caused by heat interference is corrected, thus preventing the error rate when reading signals from deteriorating.

The position of a mark-end at the end of recording may be changed according not only to the lengths of the space directly behind the recording mark and of the mark behind the space but also the lengths of at least one space and one mark further behind. In combination with this, the recording-start position of the starting-end of the mark may be changed according to the length of the mark to be recorded and a space length directly in front of the mark (and the length of a mark in front of the space). Further, by modulating the irradiation power of optical beams between a recording level and an erasing level lower than the recording level, the power of the optical beams irradiated to a portion behind a mark is made lower than the erasing level for a predetermined period. It is also preferable to combine this method. It is effective to restrain the heat interference between marks.

In another optical recording-reading method according to the present invention, the optical beam power corresponding to the starting-end and the end of a recording mark is changed. For example, the optical beam power is reduced so as to compensate for the increase in temperature due to heat interference. Specifically, when irradiating the optical beams to a recording thin film, the power of the optical beam irradiated to the starting-end is changed according to the length of a recording mark and the length of a space directly in front of the mark (and the length of a mark in front of the space). The power of the optical beams mentioned above is modulated in the pulse train including the starting-end, the intermediate portion, and the end according to the lengths of marks and spaces. Then, the power of the optical beam irradiated to the end is changed according to the length of a mark to be recorded and the length of a space directly behind the mark (and the length of a mark behind the space).

Also in this case, the optical beam power corresponding to the starting-end or the end of a recording mark may be changed according to not only the lengths of a space and a mark directly in front of and behind the recording mark but also the lengths of at least one space and one mark further ahead and behind. In addition, it is also preferable to combine the method of lowering the power of the optical beam irradiated to a portion behind the mark for a predetermined period compared to the erasing level by modulating the irradiation power of the optical beam between the recording level and the erasing level lower than the recording level.

A first configuration of an optical recording-reading device according to the present invention to realize the optical recording-reading method mentioned above comprises: a basic pulse generator that generates a starting-end pulse corresponding to the starting-end of a mark, an end pulse corresponding to the end of the mark, and at least one intermediate pulse corresponding to the intermediate portion of the mark; a recording mark detector that detects the length of a recording mark; a back space detector that detects the length of a space directly behind the recording mark; a back mark detector that detects the length of a mark behind the space directly behind the recording mark; an end pulse delaying circuit that generates a delayed end pulse that is obtained by delaying the end pulse so as to compensate for the delay quantity determined from the output signals from the recording mark detector, the back space detector, and the back mark detector; a pulse synthesizer that generates a recording pulse that is obtained by synthesizing the starting-end pulse, the intermediate pulse, and the delayed end pulse; and a laser driver that modulates the optical beam power based on the recording pulse.

A second configuration of an optical recording-reading device according to the present invention comprises: a basic pulse generator that generates a starting-end pulse corresponding to the starting-end of a mark, an end pulse corresponding to the end of the mark, and at least one intermediate pulse corresponding to the intermediate portion of the mark; a recording mark detector that detects the length of a recording mark; a front space detector that detects the length of a space directly in front of the recording mark; a starting-end power setting circuit that sets the optical beam power corresponding to the starting-end pulse based on output signals from the recording mark detector and the front space detector; and a laser driver that modulates the optical beam power based on output signals from the basic pulse generator and the starting-end power setting circuit.

A third configuration of an optical recording-reading device according to the present invention comprises: a basic pulse generator that generates a starting-end pulse corresponding to the starting-end of a mark, an end pulse corresponding to the end of the mark, and at least one intermediate pulse corresponding to the intermediate portion of the mark; a recording mark detector that detects the length of the recording mark; a back space detector that detects the length of a space directly behind the recording mark; an end power setting circuit that sets the optical beam power corresponding to the end pulse based on output signals from the recording mark detector and the back space detector; and a laser driver that modulates the optical beam power based on output signals from the basic pulse generator and the end power setting circuit.

DETAILED DESCRIPTION OF THE INVENTION

Preferable embodiments of the present invention will be explained in detail based on the drawings as follows.
Embodiment 1

Figure 1:
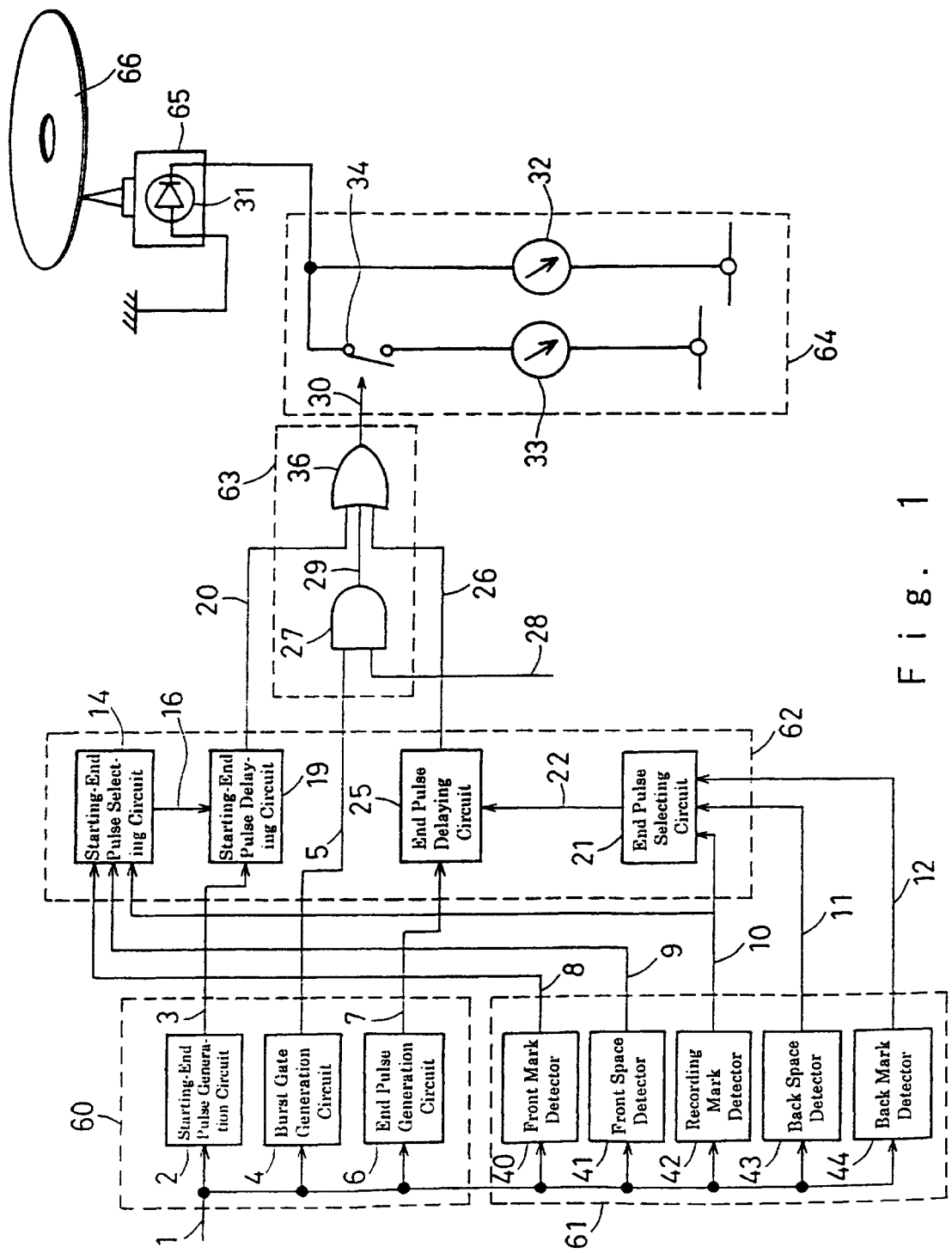
FIG. 1 is a block diagram showing an optical recording device according to Embodiment 1 of the present invention.
Figure 2:
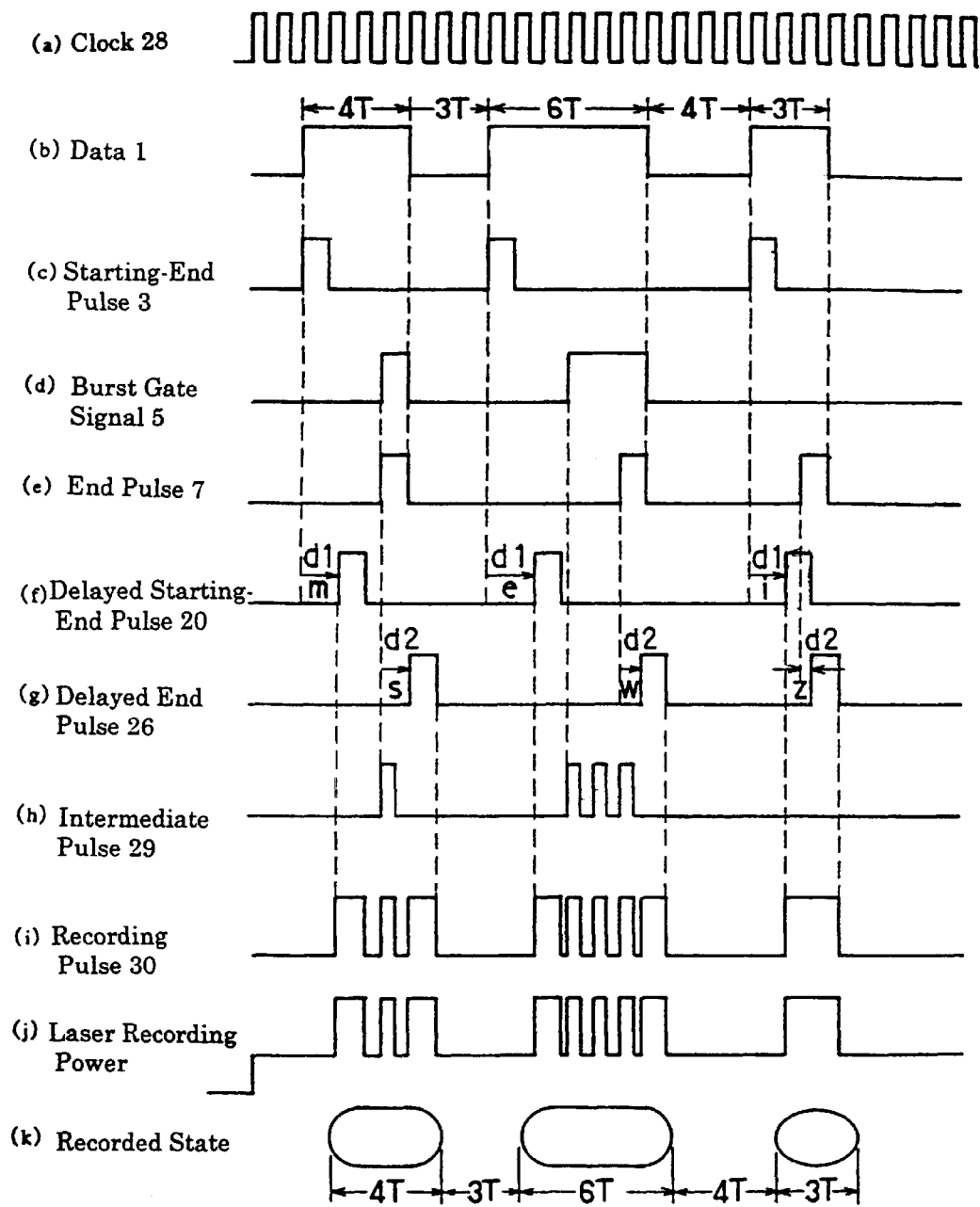
FIG. 2 is a timing chart for the optical recording device of FIG. 1.

FIG. 1 shows a block diagram of an optical recording-reading device according to Embodiment 1 of the present invention. FIG. 2 is a timing chart showing the operation of each circuit comprised in this optical recording-reading device. In FIG. 1, a basic pulse generator 60 is a circuit that generates basic pulses for forming recording marks. The basic pulse generator 60 includes a starting-end pulse generation circuit 2, a burst gate generation circuit 4, and an end pulse generation circuit 6.

A data-length detector 61 is a circuit for detecting recording marks and the lengths of spaces and marks in front of and behind the recording marks from data 1. The data-length detector 61 comprises a front mark detector 40, a front space detector 41, a recording mark detector 42, a back space detector 43 and a back mark detector 44. A timing controller 62 is a circuit that determines the delay quantity of a starting-end pulse and an end pulse according to output signals from the data-length detector 61 and generates each pulse that has been delayed. The timing controller 62 comprises a staring end pulse selecting circuit 14, a starting-end pulse delaying circuit 19, an end pulse selecting circuit 21, and an end pulse delaying circuit 25.

A pulse synthesizer 63 is a circuit that generates a final recording pulse 30 for forming marks based on output signals from the timing controller 62. The pulse synthesizer 63 comprises an AND gate 27 and an OR gate 36. A laser driver 64 is a circuit that drives a laser unit 31 corresponding to the recording pulse 30. The laser driver 64 comprises an erasing bias current source 32, a recording current source 33, and a switch 34. An optical head 65 forms recording marks by focusing the beams of the laser unit 31 on an optical recording medium 66.

In the Data 1, an H level and an L level are changed at a clock length unit. Particularly, there are EFM having an H level period and an L level period with at least three clock periods respectively, and a code signal of (2–7). The H level period and the L level period in the data correspond to marks and spaces, respectively.

Each of the detectors 40–44 in the data-length detector 61 detects mark lengths or space lengths at the clock length unit respectively. For example, when a space length is 3T or 4T in high-density recording, the heat interference between marks causes edge shift. In addition, the edge shift results in the deterioration of the error rate due to the frequency characteristics in a reading system. In fact, the influence on the error rate is determined by the combination of each mark length and space length. Therefore, the delay quantity of each pulse is determined according to each combination.

The data 1 is input to the starting-end pulse generation circuit 2, the burst gate generation circuit 4, and the end pulse generation circuit 6 that are comprised in the basic pulse generator 60. The starting-end pulse generation circuit 2 generates a starting-end pulse with one clock period (see FIG. 2(c)) at the starting-end of the H level period in the data 1 shown in FIG. 2(b). The burst gate generation circuit 4 generates a burst gate signal 5 with a length of (a mark length—three clock periods) as shown in FIG. 2(d). In this case, when the mark length has three clock periods or less, the burst gate signal 5 is not generated. The end pulse generation circuit 6 generates an end pulse 7 with one clock period (see FIG. 2(e)) at the end of the H level period in the data 1.

The data 1 is further input to a front mark detector 40, a front space detector 41, a recording mark detector 42, a back space detector 43 and a back mark detector 44 that are comprised in the data-length detector 61. The front space detector 41 outputs a detection signal 9 corresponding to a space length in front of a recording mark, i.e. corresponding to the L level period of three, four, or five clock periods or more in the data 1. The detection signal 9 is then provided to the starting-end pulse selecting circuit 14. Similarly, the front mark detector 40 and the recording mark detector 42 provide a detection signal 8 corresponding to the front-mark length and a detection signal 10 corresponding to the recording mark length to the starting-end pulse selecting circuit 14, respectively.

The starting-end pulse selecting circuit 14 determines the delaying time of the starting-end pulse based on each of the detection signals 8, 9, and 10, for example, according to Table 1.

TABLE 1

| Front Mark Length | Front Space Length | Recording Mark Length | Delaying Time d1 |
|---|---|---|---|
| 3T | 3T | 3T | a ns |
| 4T | 3T | 3T | b ns |
| 5–11T | 3T | 3T | c ns |
| 3T | 3T | 4–11T | d ns |
| 4T | 3T | 4–11T | e ns |
| 5–11T | 3T | 4–11T | f ns |
| 3T | 4T | 3T | g ns |
| 4T | 4T | 3T | h ns |
| 5–11T | 4T | 3T | i ns |
| 3T | 4T | 4–11T | j ns |
| 4T | 4T | 4–11T | k ns |
| 5–11T | 4T | 4–11T | l ns |
| 3–11T | 5–11T | 3–11T | m ns |

For instance, when a front space length is 3T, the delaying times a–f (ns) of a starting-end pulse are determined according to the combination of a front mark length and a recording mark length. When the front space length is 4T, the delaying times a–f (ns) of the starting-end pulse are determined according to the combination of the front mark length and the recording mark length. When the front space length is at least 5 T, the delaying time m (ns) is determined regardless of the recording mark length and the front mark length.

The starting-end pulse delaying circuit 19 delays a starting-end pulse 3 according to a delay signal 16 that is determined as mentioned above and is output from the starting-end pulse selecting circuit 14 and outputs the delayed starting-end pulse 20 shown in FIG. 2(f). Consequently, the delay quantity of the starting-end pulse can be changed flexibly according to the recording mark length, the front mark length, and the front space length.

The delay quantity of the end pulse also is determined in the same way. The back space detector 43 outputs a detection signal 11 corresponding to a space length behind a recording mark, i.e. corresponding to the L level period of three, four, or five clock periods or more in the data 1. The detection signal 11 is then provided to the end pulse selecting circuit 21. The back mark detector 44 provides a detection signal 12 corresponding to a back mark length and the recording mark detector 42 provides a detection signal 10 corresponding to the recording mark length to the end pulse selecting circuit 21 respectively.

The end pulse selecting circuit 21 determines the delaying time of the end pulse based on each of the detection signals 10, 11, and 12, for example, according to Table 2.

TABLE 2

| Back Mark Length | Back Space Length | Recording Mark Length | Delaying Time d2 |
|---|---|---|---|
| 3T | 3T | 3T | n ns |
| 4T | 3T | 3T | o ns |
| 5–11T | 3T | 3T | p ns |
| 3T | 3T | 4–11T | q ns |
| 4T | 3T | 4–11T | r ns |
| 5–11T | 3T | 4–11T | s ns |
| 3T | 4T | 3T | t ns |
| 4T | 4T | 3T | u ns |
| 5–11T | 4T | 3T | v ns |
| 3T | 4T | 4–11T | w ns |
| 4T | 4T | 4–11T | x ns |
| 5–11T | 4T | 4–11T | y ns |
| 3–11T | 5–11T | 3–11T | z ns |

For instance, when a back space length is 3T, the delaying times n–s (ns) of an end pulse are determined according to the combination of a back mark length and a recording mark length. When the back space length is 4T, the delaying times t–y (ns) of the end pulse are determined according to the combination of the back mark length and the recording mark length. When the back space length is at least 5 T, the delaying time z (ns) is determined regardless of the recording mark length and the front mark length.

An end pulse delaying circuit 25 delays an end pulse 7 according to a delay signal 22 that is determined as mentioned above and is output from the end pulse selecting circuit 21 and outputs the delayed end pulse 26 shown in FIG. 2(g). Consequently, the delay quantity of the end pulse can be changed flexibly according to the recording mark length, the back mark length, and the back space length.

The AND gate 27 in the pulse synthesizer 63 determines the AND of the burst gate signal 5 in FIG. 2(d) and the clock 28 in FIG. 2(a) and then outputs an intermediate pulse 29. In the case where the mark length is 3T or less, since the burst gate signal 5 is in the L level, the intermediate pulse 29 also is in the L level. The OR gate 36 determines the OR of the delayed starting-end pulse 20, the delayed end pulse 26, and the intermediate pulse 29 and then outputs the recording pulse 30 in FIG. 2(i).

The laser unit 31 generates an erasing power by the bias current source 32. The bias current source 32 is connected in parallel to a series circuit of the recording current source 33 and the switch 34. Through the on-off control by the switch 34, the laser unit 31 can be switched between the recording power and the erasing power as shown in FIG. 2(j). Consequently, by controlling the switch 34 with the recording pulse 30, the emission power of the laser unit 31 is controlled. As a result, marks and spaces can be formed on the optical recording medium 66 as shown in FIG. 2(k).

In the optical recording device of the present embodiment, the positions of the starting edge and the end-edge of a recording mark are changed according to the lengths of the recording mark and of spaces and marks in front of and behind the recording mark, thus correcting the edge shift due to heat interference. Consequently, signals with small bit errors when being read can be recorded.

In the optical recording device of the present embodiment, the delay quantity of a recording pulse starting-edge is determined based on a recording pulse length, a front space length, and a front mark length. The delay quantity of the recording pulse end is determined based on a recording pulse length, a back space length, and a back mark length. However, the present invention does not always require delaying both the starting-end and the end. Either end may be delayed as mentioned above, and the other may not be delayed or may be delayed by another method.

In the present embodiment, when the front space length is at least 5T, the delay quantity is constant. However, the present invention is not limited to this. The delay of the starting-end pulse and the end pulse may be controlled at each space and each mark according to the extent of the edge shift.

In the present embodiment, marks are recorded by a plurality of pulse trains. However, the present invention is not limited to this. The delay of the front-edge and the end-edge can be controlled by applying the present invention also in the case where marks are recorded by one rectangular pulse.

By detecting not only the lengths of spaces and marks directly in front of and directly behind the recording mark but also the lengths of at least one space and one mark further ahead and behind, the delay of the starting-end pulse and the end pulse of a recording mark may be controlled.

Embodiment 2

Figure 3:
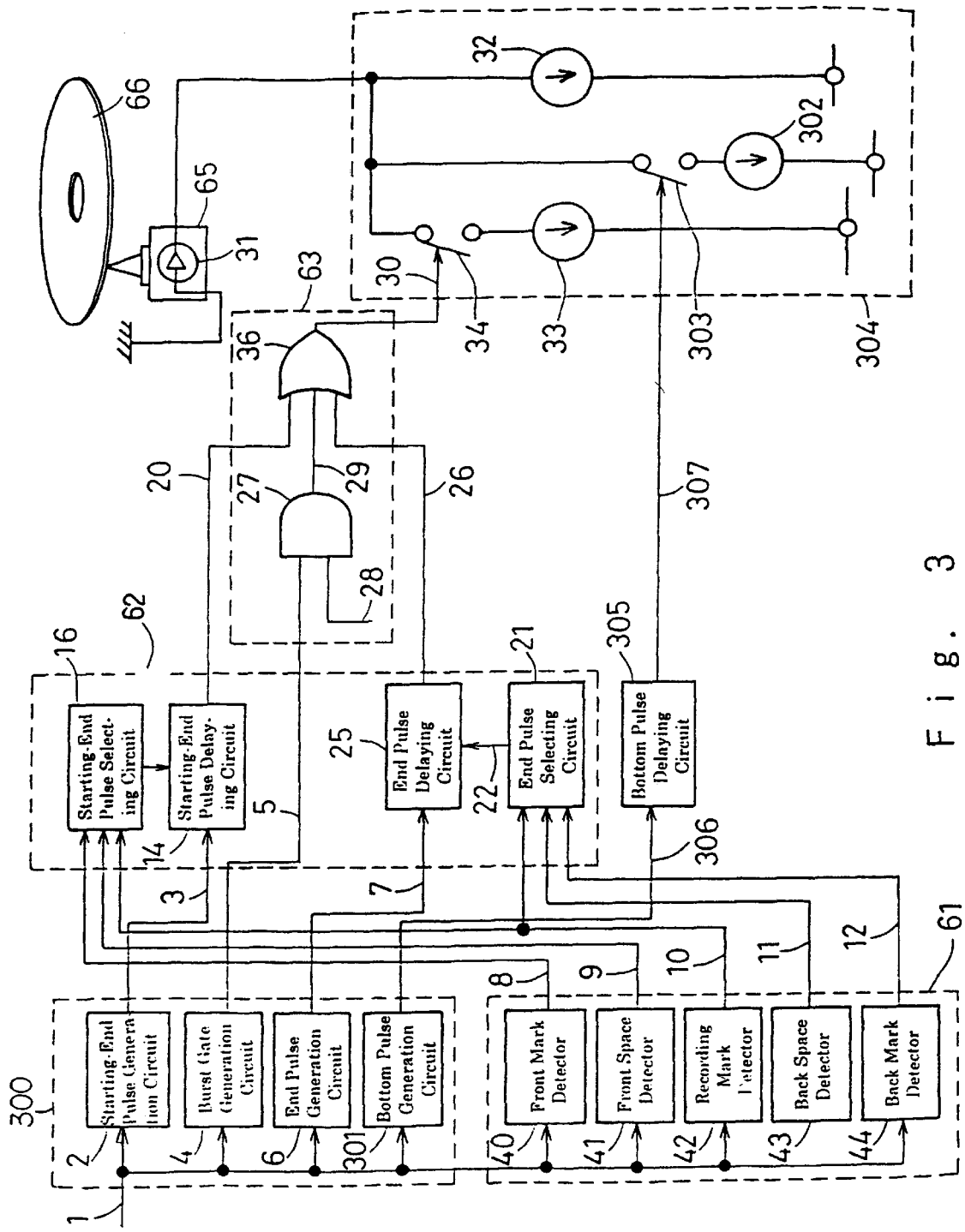
FIG. 3 is a block diagram showing an optical recording device according to Embodiment 2 of the present invention.
Figure 4:
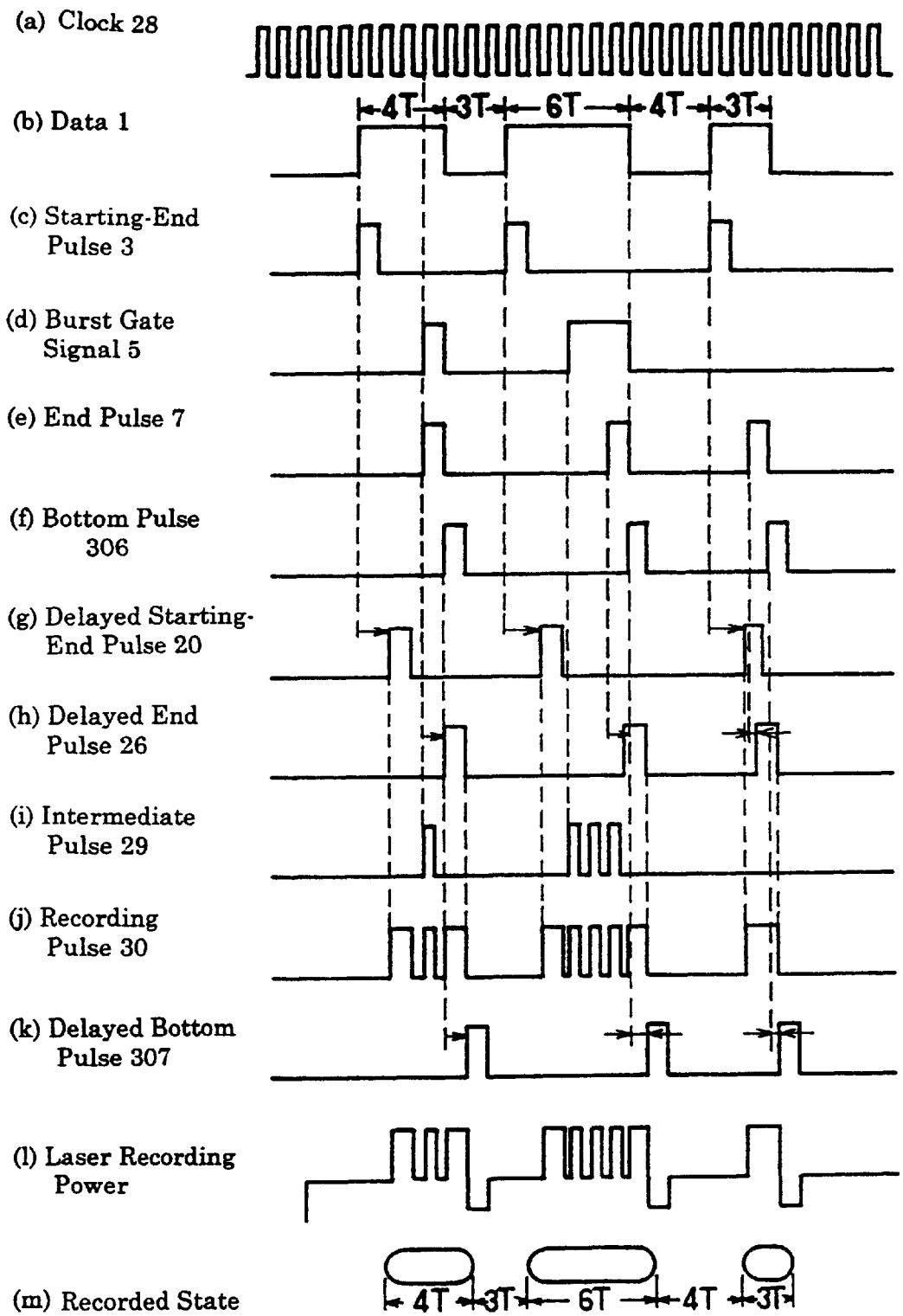
FIG. 4 is a timing chart for the optical recording device of FIG. 3.

FIG. 3 shows a block diagram of an optical recording-reading device according to Embodiment 2 of the present invention. FIG. 4 is a timing chart showing the operation of each circuit comprised in this device. The device of the present embodiment comprises a data-length detector 61, a timing controller 62, and a pulse synthesizer 63 as in Embodiment 1 shown in FIG. 1. A basic pulse generator 300 comprises a bottom pulse generation circuit 301 in addition to the basic pulse generator 60 in FIG. 1. A laser driver 304 comprises a bottom pulse current source 302 and a bottom switch 303 in addition to the laser driver 64 in FIG. 1. A bottom pulse delaying circuit 305 is provided for controlling the output timing of the bottom pulses.

In the circuits comprised in the basic pulse generation circuit 300, each circuit with the same name as in the basic pulse generator 60 in FIG. 1 has the same function. The newly added bottom pulse generation circuit 301 generates a bottom pulse 306 shown in FIG. 4(f) from the end position of the H level period in data 1. The data detector 61, the timing controller 62, and the pulse synthesizer 63 have the same function as in Embodiment 1 of FIG. 1 respectively. The bottom pulse delaying circuit 305 generates the delayed bottom pulse 307 (FIG. 4(k)) obtained by delaying the bottom pulse 306 directly behind the delayed end pulse (FIG. 4(h)).

A laser unit 31 generates an erasing power by a bias current source 32. The bias current source 32 is connected in parallel to a series circuit of a recording current source 33 and a switch 34 and further to a series circuit of the bottom pulse current source 302 and the switch 303. The switch 34 and the switch 303 control the current of the recording current source 33 and the current of the bottom pulse current source 302 so as to be on either on or off status respectively. Therefore, by controlling the switches 34 and 303 by the recording pulse 30 and the delayed bottom pulse 307 respectively, the laser beam 31 can be switched between the recording power, the erasing power, or the bottom power (see FIG. 4(l)).

In this embodiment, a bottom pulse is added to Embodiment 1. For example, by recording characteristics, linear velocity when recording information, and the like of the optical recording medium 66, the delay quantity of the end pulse is reduced and therefore the end portion of the intermediate pulse and the end pulse overlap in some cases. When the end portion of the intermediate pulse and the end pulse overlap, the power density of laser beams irradiated to the mark-end increases. Therefore, the temperature increases greatly, thus weakening the effect of reducing the heat interference between marks. In the case of the present embodiment, the power level of the laser beams irradiated to a portion behind the recording mark is made lower than the erasing power by the bottom pulse. Therefore, the heat interference caused by conducting heat of the mark-end astern can be suppressed.

The allowable power level of the laser beam corresponding to the bottom pulse is the level lower than the erasing power level. When setting the power level to the reading power level or the off level, the configuration of the laser driver 304 is simplified.

In the optical recording device of the present embodiment, the positions of the starting-edge and the end-edge of a recording mark are changed according to the recording mark length, the space lengths and the mark lengths in front of and behind the recording mark. Therefore, the edge shift due to the heat interference is corrected, and the irradiation power of the laser beams irradiated to a portion behind the recording mark is made lower than the erasing power level for a predetermined period, thus suppressing the heat interference. Consequently, signals can be recorded with small bit errors when being read.

Embodiment 3

Figure 5:
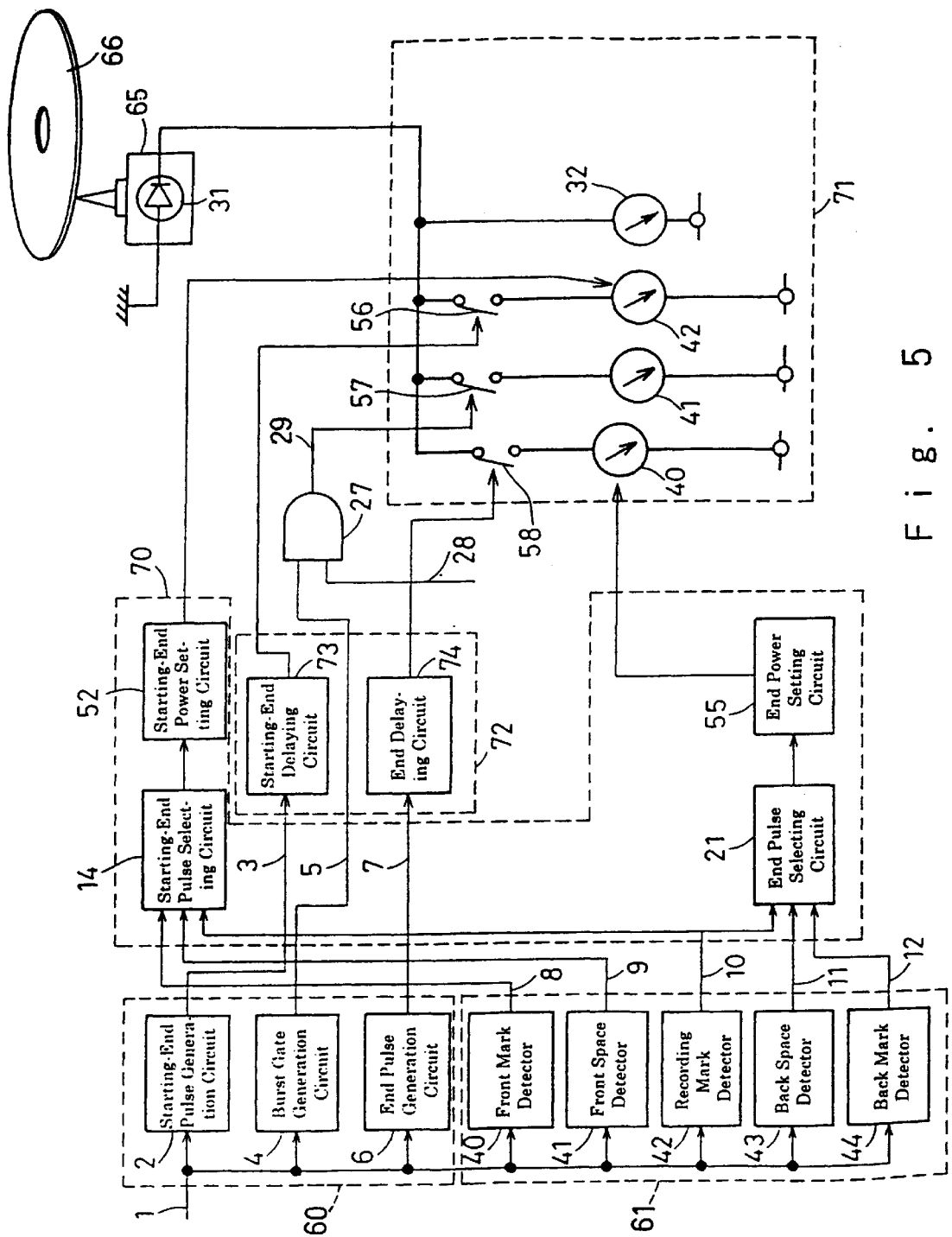
FIG. 5 is a block diagram showing an optical recording device according to Embodiment 3 of the present invention.
Figure 6:
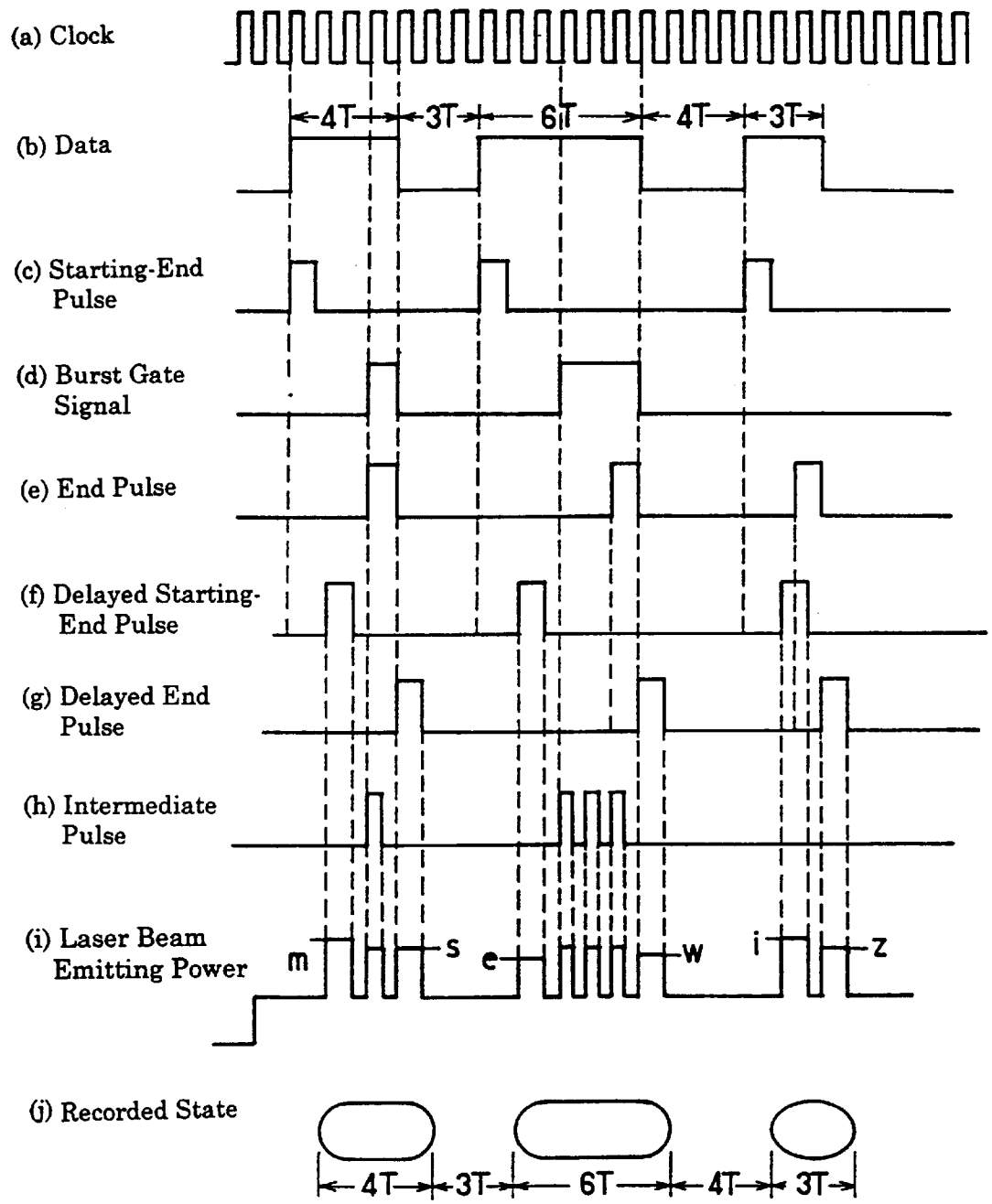
FIG. 6 is a timing chart for the optical recording device of FIG. 5.

FIG. 5 shows a block diagram of an optical recording-reading device according to Embodiment 3 of the present invention. FIG. 6 is a timing chart showing the operation of each circuit comprised in this device. The device of the present embodiment comprises a basic pulse generator 60 and a data-length detector 61 as in Embodiment 1 shown in FIG. 1. A power setting part 70 in FIG. 5 is a circuit for setting the power of a starting-end pulse and an end pulse corresponding to a recording mark. The power setting part 70 comprises a starting-end pulse selecting circuit 14, a starting-end power setting circuit 52, an end pulse selecting circuit 21, and an end power setting circuit 55.

A pulse delaying part 72 in FIG. 5 is a circuit for controlling the timing of a starting-end pulse and an end pulse. The pulse delaying part 72 comprises a starting-end delaying circuit 73 and an end delaying circuit 74. A laser driver 71 is a circuit for driving the laser unit 31 by the timing of the pulse output from the basic pulse generator 60 and by the laser power that is set in the power setting part 70. In the laser driver 71, a bias current source 32 is connected in parallel to series circuits of an end pulse current source 40 and a switch 58, of an intermediate pulse current source 41 and a switch 57, and of a starting-end pulse current source 42 and a switch 56.

As in Embodiment 1, an H level and an L level are changed at a clock length unit in Data 1. Particularly, there are EFM having an H level period and an L level period that are at least three clock periods, and a code signal of (2–7). The H level period and the L level period in the data correspond to marks and spaces, respectively.

Each of the detectors 40–44 in the data-length detector 61 detects mark lengths or space lengths at the clock length unit respectively. For example, when a space length is 3T or 4T in high-density recording, the heat interference between marks causes edge shift. In addition, the edge shift results in the deterioration of the error rate due to the frequency characteristics in a reading system. In fact, the influence on the error rate is determined by the combination of each mark length and space length. Therefore, the laser power corresponding to each pulse is determined according to each combination. The basic pulse generator 60 has the same operation as in Embodiment 1.

The starting-end pulse selecting circuit 14 determines the laser power (for instance, a peak value) corresponding to a starting-end pulse based on each of the output signals 8, 9, and 10 from a front mark detector 40, a front space detector 41, and a recording mark detector 42 respectively, for example, according to Table 3.

TABLE 3

| Front Mark Length | Front Space Length | Recording Mark Length | Laser Power p1 |
|---|---|---|---|
| 3T | 3T | 3T | a mW |
| 4T | 3T | 3T | b mW |
| 5–11T | 3T | 3T | c mW |
| 3T | 3T | 4–11T | d mW |
| 4T | 3T | 4–11T | e mW |
| 5–11T | 3T | 4–11T | f mW |
| 3T | 4T | 3T | g mW |
| 4T | 4T | 3T | h mW |
| 5–11T | 4T | 3T | i mW |
| 3T | 4T | 4–11T | j mW |
| 4T | 4T | 4–11T | k mW |
| 5–11T | 4T | 4–11T | l mW |
| 3–11T | 5–11T | 3–11T | m mW |

For instance, when a front space length is 3T, the laser powers (peak values) a–f corresponding to a starting-end pulse are determined according to the combination of a front mark length and a recording mark length. When the front space length is 4T, the laser powers g–l corresponding to a starting-end pulse are determined according to the combination of the front mark length and the recording mark length. When the front space length is at least 5 T, the laser power m corresponding to a starting-end pulse is determined regardless of the recording mark length and the front mark length. The starting-end power setting circuit 52 controls the starting-end pulse current source 42 so that the laser unit 31 emits beams at the laser power determined as mentioned above.

Similarly, the end pulse selecting circuit 21 determines the laser power (for instance, a peak value) corresponding to an end pulse based on each of the output signals 10, 11, and 12 of the recording mark detector 42, a back space detector 43, and a back mark detector 44 respectively, for example, according to Table 4.

TABLE 4

| Back Mark Length | Back Space Length | Recording Mark Length | Laser Power p2 |
|---|---|---|---|
| 3T | 3T | 3T | n mW |
| 4T | 3T | 3T | o mW |
| 5–11T | 3T | 3T | p mW |
| 3T | 3T | 4–11T | q mW |
| 4T | 3T | 4–11T | r mW |
| 5–11T | 3T | 4–11T | s mW |
| 3T | 4T | 3T | t mW |
| 4T | 4T | 3T | u mW |
| 5–11T | 4T | 3T | v mW |
| 3T | 4T | 4–11T | w mW |
| 4T | 4T | 4–11T | x mW |
| 5–11T | 4T | 4–11T | y mW |
| 3–11T | 5–11T | 3–11T | z mW |

For instance, when a back space length is 3T, the laser powers (peak value) n–s corresponding to an end pulse are determined according to the combination of a recording mark length and a back mark length. When the back space length is 4T, the laser powers t–y corresponding to an end pulse are determined according to the combination of the recording mark length and the back mark length. When the back space length is at least 5 T, the laser power n corresponding to an end pulse is determined regardless of the recording mark length and the back mark length. The end power setting circuit 55 controls the end pulse current source 40 so that the laser unit 31 emits beams at the laser power determined as mentioned above.

In FIG. 6(i), the peak value of the intermediate pulse 29 is fixed to a suitable value. A starting-end delaying circuit 73 in FIG. 5 controls the timing for generating starting-end pulses. In FIG. 6, the delay quantity is set to 1.5T. An end delaying circuit 74 controls the timing for generating end pulses. In FIG. 6, the delay quantity is set to 1T.

A laser driver 71 in FIG. 5 comprises series circuits of a starting-end pulse current source 42 and a switch 56, of an intermediate pulse current source 41 and a switch 57, and of an end pulse current source 40 and a switch 58, and a bias current source 32 connected in parallel to the series circuits. The starting-end pulse, the intermediate pulse, and the end pulse control the three switches 56, 57, and 58, respectively. Consequently, the laser unit 31 can emit laser beams for one recording mark at the starting-end power, the intermediate power, and the end power, each of which has an independent peak value as shown in FIG. 6(i).

In the optical recording device of the present embodiment, the peak values of the laser power for recording marks are controlled at the mark starting-end, at the intermediate portion, and at the end independently according to the recording mark length and the space lengths and mark lengths in front of and behind the recording mark. Therefore, the edge shift due to heat interference can be suppressed. As a result, signals can be recorded with small bit errors when being read.

In the present embodiment, the laser powers at the starting-end and at the end are set to be constant as to data with a space of at least 5 T. However, the present invention is not limited to this.

In the optical recording device of the present embodiment, the laser power at the starting-end of a recording pulse is changed according to the recording pulse length, the front space length, and the front mark length. The laser power at the end of the recording pulse is changed according to the recording pulse length, the back space length, and the back mark length. However, it is not always necessary to change the laser powers at both the starting-end and the end in the present invention. The laser power only at either end may be changed as mentioned above, and the laser power at the other end may be constant or may be changed by another method.

Embodiment 4

Figure 7:
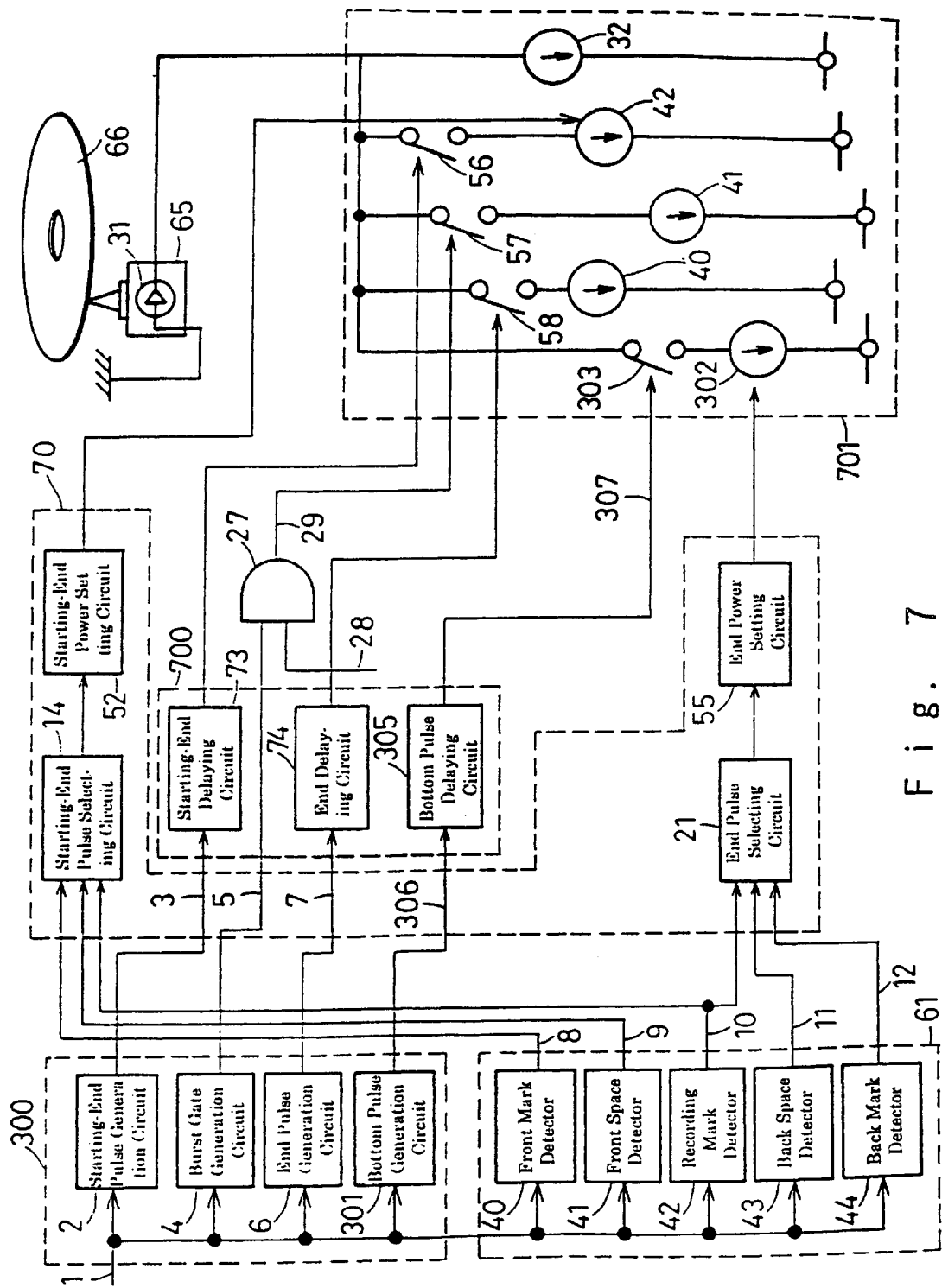
FIG. 7 is a block diagram showing an optical recording device according to Embodiment 4 of the present invention.
Figure 8:
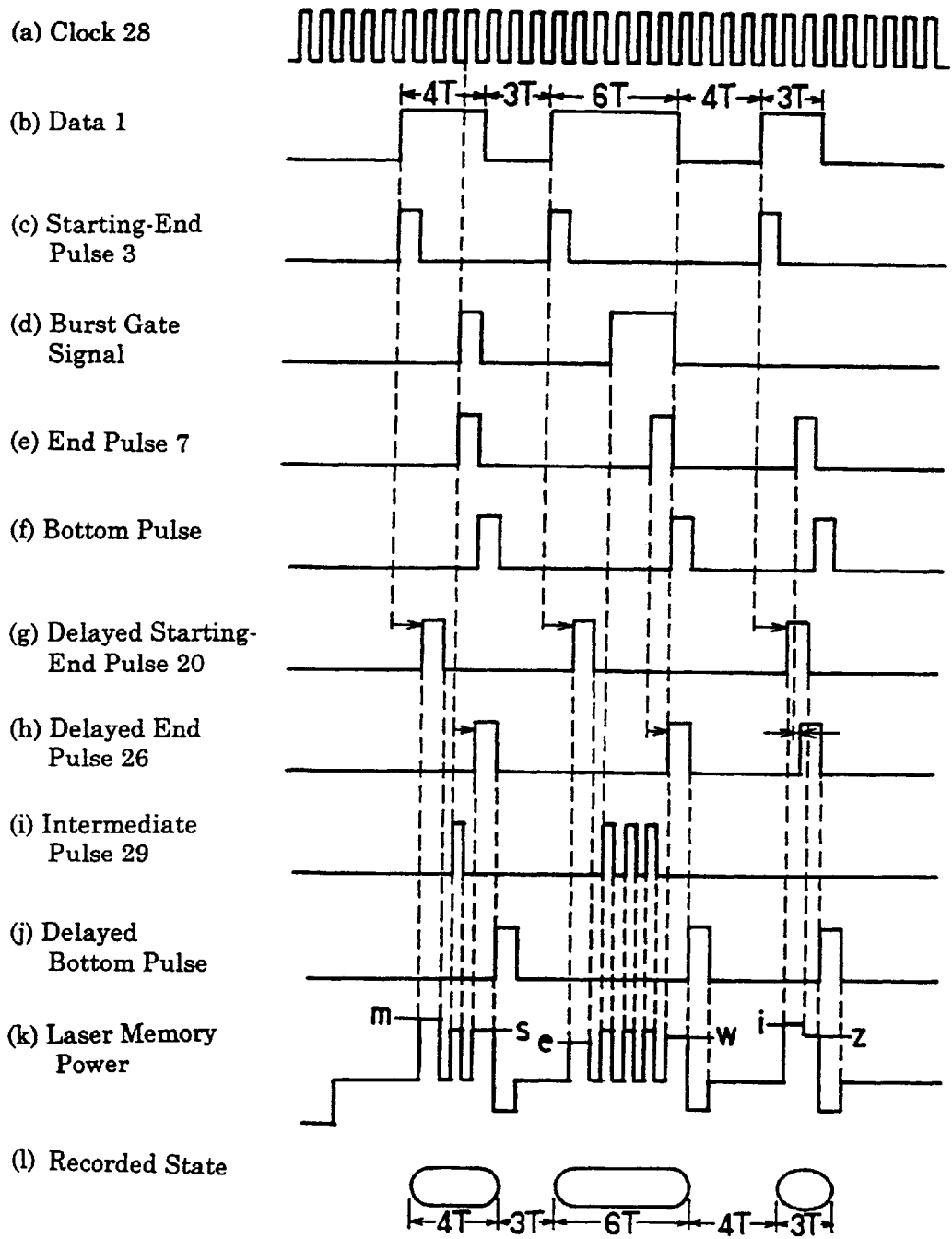
FIG. 8 is a timing chart for the optical recording device of FIG. 7.
Figure 9:
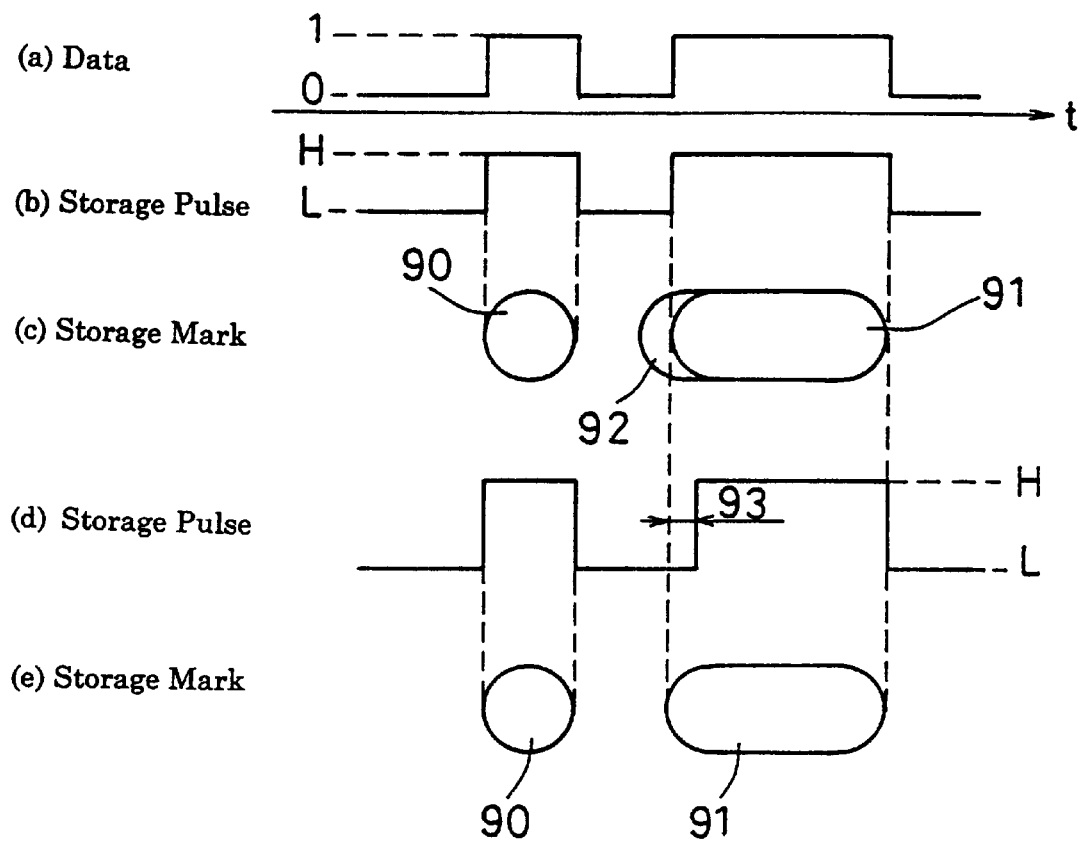
FIG. 9 is a drawing showing a recording method in a conventional optical recording device.

FIG. 7 shows a block diagram of an optical recording-reading device according to Embodiment 4 of the present invention. FIG. 8 is a timing chart showing the operation of each circuit comprised in this device. FIG. 7 comprises a data-length detector 61 and a power setting part 70 as in Embodiment 3 shown in FIG. 5. The present embodiment further comprises a basic pulse generator 300 in which a bottom pulse generation circuit 301 is added, a pulse delaying part 700 in which a bottom pulse delaying circuit 305 is added, and a laser driver 701 in which a bottom pulse current source 302 and a switch 303 are added.

In the circuits comprised in the basic pulse generator 300, each circuit with the same name as in the basic pulse generator 60 in FIG. 5 has the same function. The newly added bottom pulse generation circuit 301 generates a bottom pulse 306 shown in FIG. 8(f) from the end position of the H level period in data 1. The data-length detector 61 and the power setting part 70 have the same function as in Embodiment 3 shown in FIG. 5 respectively. The bottom pulse delaying circuit 305 controls the timing of the bottom pulse, and the delayed bottom pulse 307 (FIG. 8(j)) obtained by delaying the bottom pulse 306 is generated just behind the delayed end pulse (FIG. 8(h)).

A laser unit 31 generates an erasing power by a bias current source 32. This bias current source 32 is connected in parallel to series circuits of a starting-end pulse current source 42 and a switch 56, of an intermediate pulse current source 41 and a switch 57, of an end pulse current source 40 and a switch 58, and of a bottom current source 302 and a switch 303. A delayed starting-end pulse, an intermediate pulse, a delayed end pulse, and a delayed bottom pulse control the on-off status of the four switches respectively. Therefore, the laser unit 31 can emit laser beams for one mark at a starting-end power, an intermediate power, an end power and a bottom power as shown in FIG. 8(k). Thus, the use of an optical head 65 containing the laser unit 31 enables the marks and spaces shown in FIG. 8(l) to be formed on an optical recording medium 66.

In the present embodiment, the bottom pulse is added to Embodiment 3. For example, even if the power peak values at the starting-end and at the end are decreased to the lower limit of the power for forming a suitable mark by recording characteristics, linear velocity when recording information, and the like in the optical recording medium 66, the heat interference between marks can not be suppressed sufficiently in some cases. In the case of the present embodiment, the laser power irradiated to a portion behind the recording mark is made lower than the erasing power by the bottom pulse. Therefore, the heat interference caused by conducting heat of the mark-end behind can be suppressed efficiently.

An allowable power level of the laser beam corresponding to the bottom pulse is the level lower than the erasing power level. When setting the power level to the reading power level or the off level, the configuration of the laser driver 701 is simplified.

In the optical recording device of the present embodiment, the peak values of the laser power for recording marks are controlled at the mark starting-end, the intermediate portion, and the end independently according to the recording mark length and the space lengths and mark lengths in front of and behind the recording mark. Therefore, the edge shift due to the heat interference is corrected, and the irradiation power of the laser beams irradiated to a portion behind the recording mark is made lower than the erasing power level for a predetermined period, thus suppressing the heat interference. Consequently, signals can be recorded with small bit errors when being read.

As described above, according to the present invention, when recording information as mark lengths at high density on an optical recording medium, the edge shift of the recording marks can be corrected or controlled, thus reducing bit errors of read signals. Consequently, the data recording density can be further increased and the capacity of an optical recording medium can be increased.

The invention may be embodied in other forms without departing from the spirit or essential characteristics thereof. The embodiments disclosed in this application are to be considered in all respects as illustrative and not limitative, the scope of the invention is indicated by the appended claims rather than by the foregoing description, and all changes which come within the meaning and range of equivalency of the claims are intended to be embraced therein.

What is claimed is:

1. An optical recording method of recording information on an optical recording medium having a recording thin film on a substrate, the state of the recording thin film being changed by irradiating optical beams, wherein in order to record the information on the recording thin film as lengths of marks and spaces, when irradiating optical beams on the recording thin film, the power of the optical beams being modulated in a pulse train including a starting-end, an intermediate portion, and an end according to the lengths of the marks and spaces, the power of an optical beam irradiated to the starting-end is changed according to the lengths of a mark to be recorded and of a space directly in front of the mark.

2. An optical recording method of recording information on an optical recording medium having a recording thin film on a substrate, the state of the recording thin film being changed by irradiating optical beams, wherein in order to record the information on the recording thin film as lengths of marks and spaces, when irradiating optical beams on the recording thin film, the power of the optical beams being modulated in the pulse train including a starting-end, an intermediate portion, and an end according to the lengths of the marks and spaces, the power of an optical beam irradiated to the starting-end is changed according to the lengths of a mark to be recorded, of a space directly in front of the mark, and of a mark in front of the space.

3. An optical recording method of recording information on an optical recording medium having a recording thin film on a substrate, the state of the recording thin film being changed by irradiating optical beams, wherein in order to record the information on the recording thin film as lengths of marks and spaces, when irradiating optical beams on the recording thin film, the power of the optical beams being modulated in the pulse train including a starting-end, an intermediate portion, and an end according to the lengths of the marks and spaces, the power of an optical beam irradiated to the starting-end is changed according to the lengths of a mark to be recorded, of a space directly in front of the mark, of a mark in front of the space, and of at least one space and one mark further ahead.

4. An optical recording method of recording information on an optical recording medium having a recording thin film on a substrate, the state of the recording thin film being changed by irradiating optical beams, wherein in order to record the information on the recording thin film as lengths of marks and spaces, when irradiating optical beams on the recording thin film, the power of the optical beams being modulated in a pulse train including a starting-end, an intermediate portion, and an end according to the lengths of the marks and spaces, the power of an optical beam irradiated to the starting-end is changed according to the lengths of a mark to be recorded and of a space directly in front of the mark, and the power of an optical beam irradiated to the end is changed according to the lengths of a mark to be recorded and of a space directly behind the mark.

5. An optical recording method of recording information on an optical recording medium having a recording thin film on a substrate, the state of the recording thin film being changed by irradiating optical beams, wherein in order to record the information on the recording thin film as lengths of marks and spaces, when irradiating optical beams on the recording thin film, the power of the optical beams being modulated in a pulse train including a starting-end, an intermediate portion, and an end according to the lengths of the marks and spaces, the power of an optical beam irradiated to the starting-end is changed according to the lengths of a mark to be recorded, of a space directly in front of the mark, and of a mark in front of the space, and the power of an optical beam irradiated to the end is changed according to the lengths of a mark to be recorded, of a space directly behind the mark, and of a mark behind the space.

6. An optical recording device in which in order to record information on an optical recording medium having a recording thin film on a substrate, the state of the recording thin film being changed by irradiating optical beams on a substrate, the information is recorded on the recording thin film as lengths of marks and spaces by optical beams, the power of the optical beams being modulated in a pulse train, the device comprising:

a basic pulse generator that generates a starting-end pulse corresponding to the starting-end of the mark, an end pulse corresponding to the end of the mark, and at least one intermediate pulse corresponding to the intermediate portion of the mark;

a recording mark detector that detects the length of a recording mark;

a front space detector that detects the length of a space directly in front of the recording mark;

a starting-end power setting circuit that sets the optical beam power corresponding to the starting-end pulse based on output signals from the recording mark detector and the front space detector; and a laser driver that modulates the optical beam power based on output signals from the basic pulse generator and the starting-end power setting circuit.

7. The optical recording device according to claim 6, further comprising a front mark detector that detects the length of a mark in front of the space directly in front of the recording mark, wherein the starting-end power setting circuit sets the optical beam power corresponding to the starting-end pulse based on output signals from the recording mark detector, the front space detector, and the front mark detector.

* * * * *